(12) United States Patent
Taylor

(10) Patent No.: US 6,966,141 B1
(45) Date of Patent: Nov. 22, 2005

(54) BALLISTIC FISHING LURE WITH PONTOONS

(76) Inventor: John B. Taylor, 5640 Encore Dr., Dallas, TX (US) 75240

( * ) Notice: Subject to any disclaimer, the term of this patent is extended or adjusted under 35 U.S.C. 154(b) by 31 days.

(21) Appl. No.: 10/711,902

(22) Filed: Oct. 12, 2004

(51) Int. Cl.⁷ .......................................... A01K 85/00
(52) U.S. Cl. .................................. 43/42.02; 43/42.36
(58) Field of Search ........................ 43/42.02, 42.06, 43/42.36

(56) References Cited

U.S. PATENT DOCUMENTS

| | | | |
|---|---|---|---|
| 941,911 A * | 11/1909 | Burthe | 43/42.02 |
| 1,144,756 A * | 6/1915 | Damsma | 43/42.36 |
| 1,538,658 A * | 5/1925 | Rindt | 43/42.02 |
| 1,941,370 A * | 12/1933 | Vann | 43/42.36 |
| 2,357,472 A * | 9/1944 | Jenkins | 43/42.02 |
| 2,470,861 A * | 5/1949 | Prentice | 43/42.36 |
| 2,532,879 A * | 12/1950 | Baker | 43/42.06 |
| 2,690,026 A * | 9/1954 | King | 43/42.02 |
| 2,700,842 A | 2/1955 | Lehmann | 43/35 |
| 2,750,701 A * | 6/1956 | Beames | 43/42.36 |
| 2,750,703 A * | 6/1956 | Puste | 43/42.06 |
| 2,794,287 A * | 6/1957 | Mancuis, Jr. | 43/42.02 |
| 2,932,112 A * | 4/1960 | Graves, Jr. | 43/42.02 |
| 2,964,870 A * | 12/1960 | Dishon | 43/42.02 |
| 2,979,849 A * | 4/1961 | Anderson, Jr. | 43/42.02 |
| 3,054,209 A | 9/1962 | Wiley, Jr. | 43/42.02 |
| 3,134,190 A * | 5/1964 | Triplett et al. | 43/42.06 |
| 3,440,756 A * | 4/1969 | Leadbetter | 43/42.06 |
| 3,457,667 A * | 7/1969 | Tripp | 43/42.02 |
| 4,208,822 A * | 6/1980 | Bryant | 43/42.02 |
| 4,676,020 A * | 6/1987 | Taylor et al. | 43/42.02 |
| 4,982,524 A | 1/1991 | Vissing | 43/42.02 |
| 5,035,075 A * | 7/1991 | Pearce | 43/42.02 |
| 5,088,227 A * | 2/1992 | Toner et al. | 43/42.02 |
| 5,119,581 A | 6/1992 | Rudolph | 43/42.22 |
| 5,265,368 A * | 11/1993 | Taylor | 43/42.06 |
| 5,787,633 A * | 8/1998 | Taylor | 43/42.02 |
| 6,094,854 A * | 8/2000 | Dalier, Jr. | 43/42.02 |
| 6,233,864 B1 * | 5/2001 | Mathews et al. | 43/42.02 |
| 6,678,993 B1 * | 1/2004 | Long | 43/42.02 |

FOREIGN PATENT DOCUMENTS

| | | | |
|---|---|---|---|
| JP | 10-136834 A | * | 5/1998 |
| JP | 11-46628 A | * | 2/1999 |
| JP | 11-137124 A | * | 5/1999 |
| JP | 2000-4720 A | * | 1/2000 |
| JP | 2000-125704 A | * | 5/2000 |
| JP | 2000-236780 A | * | 9/2000 |
| JP | 2000-342118 A | * | 12/2000 |
| JP | 2001-299153 A | * | 10/2001 |
| JP | 2004-290077 A | * | 10/2004 |
| WO | WO-97/45007 A1 | * | 12/1997 |

* cited by examiner

Primary Examiner—Darren W. Ark
(74) Attorney, Agent, or Firm—Daniel V. Thompson

(57) ABSTRACT

A fishing lure includes a main body member. A cap is sealingly fixed to a aft end of the main body member. A slider tube is telescopingly engaged with the main body member extends forwardly away from main body member against the force of a cylindrical coil spring within the slider tube. A jumping motion is created for the lure when the slider tube is extended and then released.

9 Claims, 3 Drawing Sheets

BALLISTIC FISHING LURE WITH PONTOONS

DESCRIPTION

1. Technical Field

This invention relates to a fishing lures, and more particularly a fishing lure having a fish-attractive jumping lure motion.

2. Background Art

An almost infinite variety of styles and types of fishing lures are available. It has not been known, however, to provide a fishing lure that provides a jumping motion to simulate the motion of bait.

SUMMARY OF THE INVENTION

The present invention provides structure for using the drag of the lure through the water and a reversal of flow direction within the lure to provide a jumping motion.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
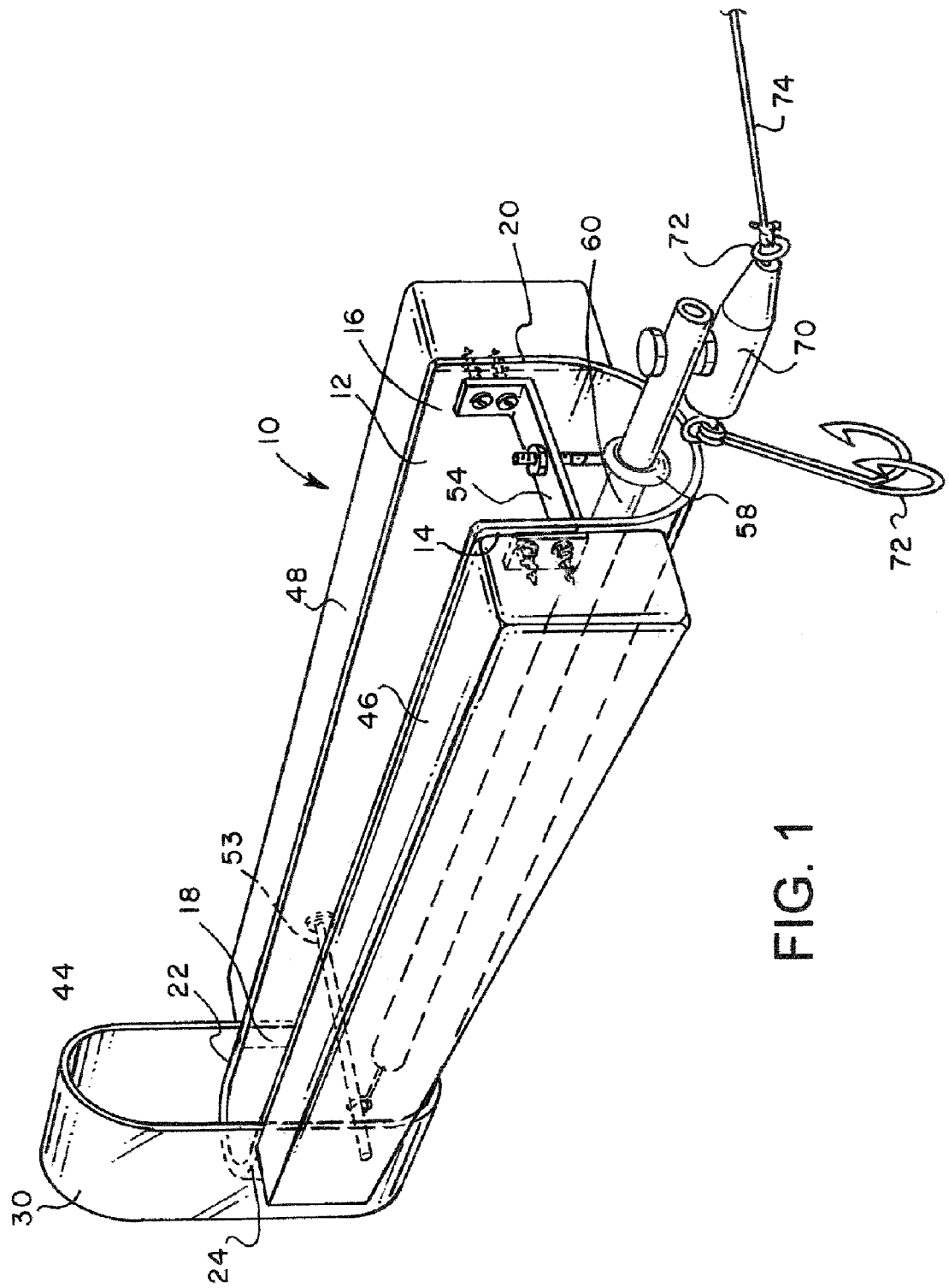
FIG. 1 is a perspective view of a fishing lure constructed in accordance with the invention.
Figure 2:
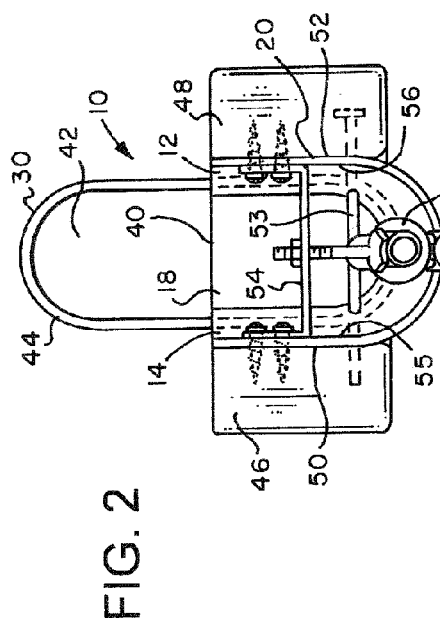
FIG. 2 is an end view of the fishing lure.

Referring initially to FIGS. 1–4, where like numerals indicate like and corresponding elements, a lure 10 includes a main body member 12 formed from thin, resilient film 14. The main body member 12 has fore and aft ends 16,18 and upwardly-open, U-shaped, longitudinal cross-sections as best shown in FIG. 2. The main body member 12 tapers to smaller dimensions both vertically and horizontally from the fore to aft ends 16,18, with the vertical taper best shown in FIG. 3 and the horizontal taper best shown in FIG. 2. The main body member 12 has an open mouth 20 at the fore end 16 and an open exit 22 at the aft end 18. The exit 22 has opposed vertical exterior side walls 24,26 joined by a curved exterior bottom wall 28 and back wall 29.

A forwardly-open cap 30 extends upwardly from the exit 22 of the main body member 12. The cap 30 has opposed lower interior side walls 32,34 sealingly joined to the vertical exterior side walls 24,26 of the exit 22. The cap 30 has a curved interior bottom wall 36 sealingly joined to the curved exterior bottom wall 28 of the exit 22, and an aft vertical interior wall 40 sealingly joined to back wall 29.

The cap 30 further has a curved upper interior wall 42 joined to a top of the aft vertical wall 40, such that water entering the open mouth 20 of the main body member 12 is routed aftwardly to the exit 22, then upwardly along the cap vertical wall 40, and then forwardly along the curved upper interior wall 42 to an open exit 44 of the cap 30 located above the main body member exit 22.

Figure 4:
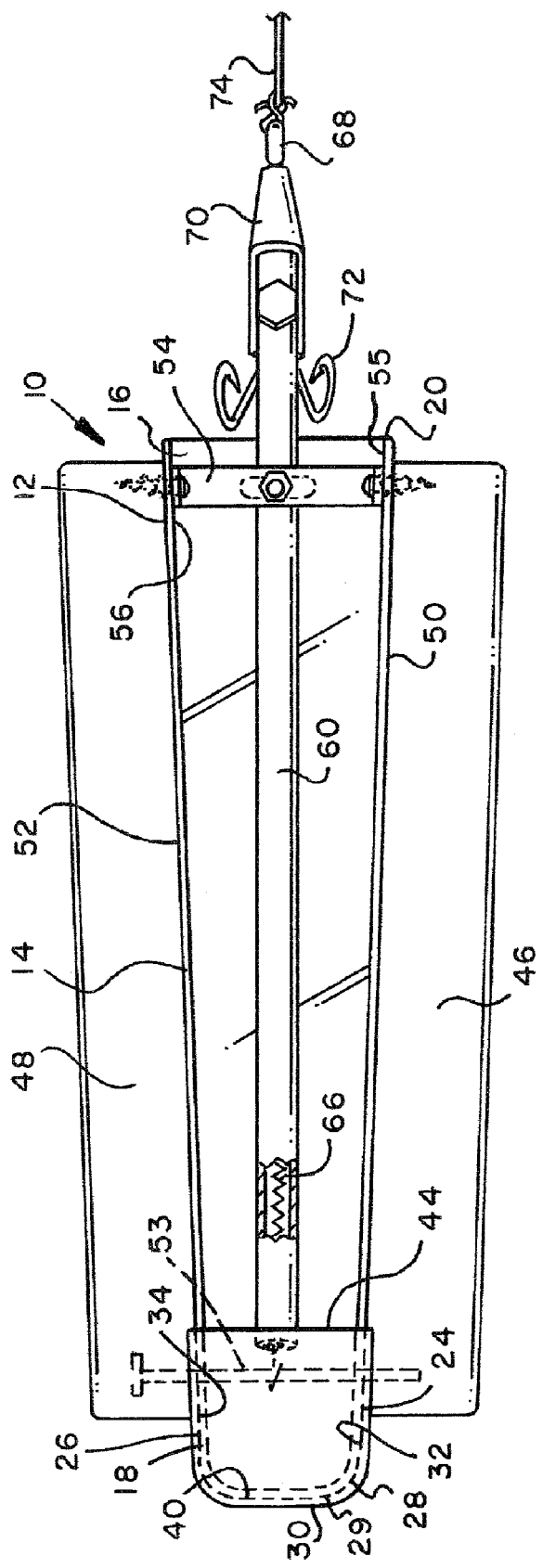
FIG. 4 is a partially broken away top view of the fishing lure.

Two rectangular block-shaped flotation pontoons 46,48 are provided. Each pontoon 46,48 spans essentially all of one of two opposing exterior side walls 50,52 of the main body member 12, as best shown in FIG. 4. The horizontal taper of main body member 12, and the forward position of slider tube 60 and weight 70, are selected to position the fore end 16 of the main body member 12 below the water line and the aft end 18 of the main body member 12 above the water line, when the lure 10 is in water at rest.

Figure 3:
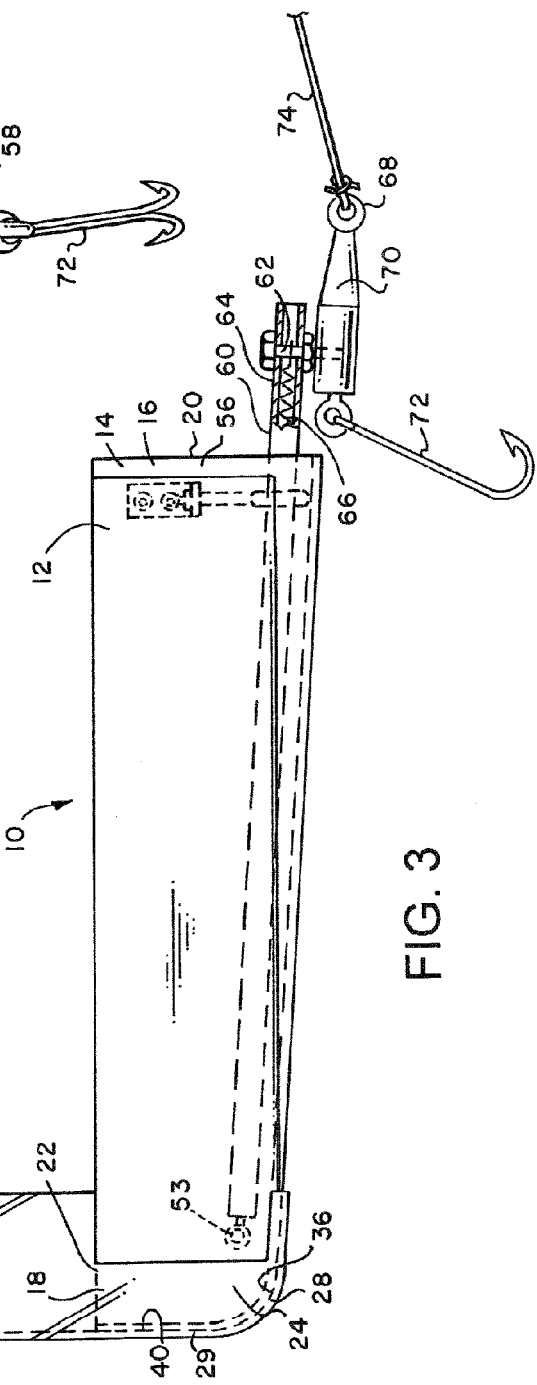
FIG. 3 is a partially broken away side view of the fishing lure.

A spring anchor rod 53 is fixed to and spans the flotation pontoons 46,48 in the aft end 18 of the main body member 12. A guide ring support 54 is fixed to and spans the interior side walls 55,56, of the main body member 12 at the mouth 20. A guide ring 58 depends from the guide ring support 54. A slider tube 60 is interfitted with the guide ring 58 for relative translating motion with respect to the main body member 12 within the guide ring 58. A spring post 62 extends through a forward end 64 of the slider tube (FIG. 3). A cylindrical coil spring 66 is substantially entirely within the slider tube 60, the spring 66 extending between a forward end engaged with the spring post 62 and an aft end engaged with the spring anchor rod 53.

A suitable eye 68, weight 70 and hook 72 are provided as shown in FIG. 3, with the spring post 62 being fixed to the weight 70. Line 74 is connected to eye 68 and extends to a fisherman (not shown).

The length and spring rate of the coil spring 66 is selected such that when the lure 10 is pulled through water, with the main body member 12 and cap 30 creating drag and circulating water through the main body member 12 and the cap 30, the slider tube 60 translates with respect to the main body member 12 thereby elongating the coil spring 66 to create tension opposing the drag. When tension on the lure 10 is released, the slider tube 60 is translated under spring tension back to the spring anchor rod 53, thereby creating a fish-attractive, jumping lure motion.

In addition, preferably film 14 and pontoons 46,48 are printed with a bait pattern, such as a shrimp or a bait fish pattern, although various colors and even transparent films/pontoons may be usable. The balance and corresponding attitude of the lure may be adjusted by the adjustment of the weights of the various elements and careful selection of the weight of the hook.

In operation, the lure is hollow with a plastic film exterior. The film thickness is selected to emulate the firmness of the creature depicted on the film, where the film is printed. Flotation pontoons 46,48 position the main body member 12 such that the water line is approximately midway between the fore and aft ends of the main body member when the lure is at rest. When the lure is pulled, water is forced back into the main body member and is redirected 180 degrees by the cap 30. Simultaneously, the slider tube 60 translates forwardly against the pressure of spring 66. When the pulling action on line 74 ceases, the spring pulls the slider tube back to spring anchor rod, sending the lure out of the water in a ballistic, jumping fashion.

Whereas, the present invention has been described with respect to a specific embodiment thereof, it will be understood that various changes and modifications will be suggested to one skilled in the art, and it is intended to encompass such changes and modifications as fall within the scope of the appended claims.

What is claimed is:

1. A fishing lure comprising:
    a main body member formed from thin, resilient film, the main body member having fore and aft ends and upwardly-open, U-shaped, longitudinal cross-sections;
    the main body member having an open mouth at the fore end and an open exit at the aft end, the exit having opposed vertical exterior side walls joined by a curved exterior bottom wall and a back wall;

a forwardly-open cap extending upwardly from the exit of the main body member, the cap sealingly joined to at least one of the walls of the main body member exit;

the cap further having a curved interior bottom wall joined to the bottom of an aft vertical interior wall, and a curved upper interior wall joined to a top of the aft vertical wall, such that water entering the open mouth of the main body member is routed aftwardly to the exit, then upwardly along the cap vertical wall, and then forwardly along the curved upper interior wall to an open exit of the cap located above the main body member exit;

at least one floatation pontoon fixed to the main body member, the at least one floatation pontoon adapted to position the fore end of the main body member below the water line and the aft end of the main body member above the water line when the lure is in water at rest;

a spring anchor rod fixed to the aft end of the main body member;

a guide ring support fixed to the main body member at the mouth;

a guide ring depending from the guide ring support;

a slider tube interfitted with the guide ring for relative translating motion with respect to the main body member within the guide ring;

a spring post at a forward end of the slider tube;

a cylindrical coil spring extending between a forward end engaged with the spring post and an aft end engaged with the spring anchor rod; and the length and spring rate of the coil spring being selected such that when the lure is pulled through water, with the main body member and cap creating drag and circulating water through the main body member and the cap, the slider tube telescopes with respect to the main body member thereby elongating the coil spring to create tension opposing the drag, and when tension on the lure is released, the slider tube is translated under spring tension back to the spring anchor rod, thereby creating a fish-attractive, jumping lure motion.

2. The fishing lure of claim 1 with the main body member tapering to smaller dimensions both vertically and horizontally from the fore end to the aft ends.

3. The fishing lure of claim 1 with the cap having opposed lower middle interior side walls sealingly joined at forward portions to the vertical exterior side walls of the exit, and the cap having the curved interior bottom wall sealingly joined at a forward portion to the curved exterior bottom wall of the exit.

4. The fishing lure of claim 1 with the at least one floatation pontoon comprising two rectangular block-shaped floatation pontoons, each pontoon spanning essentially all of one of two opposing exterior side walls of the main body member.

5. The fishing lure of claim 4 with the spring anchor rod fixed to and spanning the flotation pontoons in the aft end of the main body member.

6. The fishing lure of claim 1 with the guide ring support fixed to and spanning interior side walls of the main body member at the mouth.

7. The fishing lure of claim 1 with the spring post extending through a forward end of the slider tube.

8. The fishing lure of claim 1 with the cylindrical coil spring being substantially entirely within the slider tube.

9. A fishing lure, comprising:

a main body member formed from thin, resilient film, the main body member having fore and aft ends and upwardly-open, U-shaped, longitudinal cross-sections, with the main body member tapering to smaller dimensions both vertically and horizontally from the fore end to the aft ends;

the main body member having an open mouth at the fore end and an open exit at the aft end, the exit having opposed vertical exterior side walls joined by a curved exterior bottom wall and a back wall;

a forwardly-open cap extending upwardly from the exit of the main body member, the cap having opposed lower interior side walls sealingly joined to the vertical exterior side walls of the exit, and the cap having a curved interior bottom wall sealingly joined to the curved exterior bottom wall of the exit, and an aft vertical interior wall joined to the back wall of the exit;

the cap further having the curved interior bottom wall joined to the bottom of an aft vertical interior wall, and a curved upper interior wall joined to a top of the aft vertical wall, such that water entering the open mouth of the main body member is routed aftwardly to the exit, then upwardly along the cap vertical wall, and then forwardly along the curved upper interior wall to an open exit of the cap located above the main body member exit;

two rectangular block-shaped floatation pontoons, each pontoon spanning essentially all of one of two opposing exterior side walls of the main body member, the floatation pontoons adapted to position the fore end of the main body member below the water line and the aft end of the main body member above the water line, when the lure is in water at rest;

a spring anchor rod fixed to and spanning the floatation pontoons in the aft end of the main body member;

a guide ring support fixed to and spanning interior side walls of the main body member at the mouth;

a guide ring depending from the guide ring support;

a slider tube interfitted with the guide ring for relative translating motion with respect to the main body member within the guide ring;

a spring post extending through a forward end of the slider tube;

a cylindrical coil spring substantially entirely within the slider tube, the spring extending between a forward end engaged with the spring post and an aft end engaged with the spring anchor rod; and the length and spring rate of the coil spring being selected such that when the lure is pulled through water, with the main body member and cap creating drag and circulating water through the main body member and the cap, the slider tube translates with respect to the main body member thereby elongating the coil spring to create tension opposing the drag, and when tension on the lure is released, the slider tube is translated under spring tension back to the spring anchor rod, thereby creating a fish-attractive, jumping lure motion.

* * * * *